E. C. HILLMAN.
RAIN AND SUN SHIELD.
APPLICATION FILED JUNE 1, 1920.
1,374,919.
Patented Apr. 19, 1921.
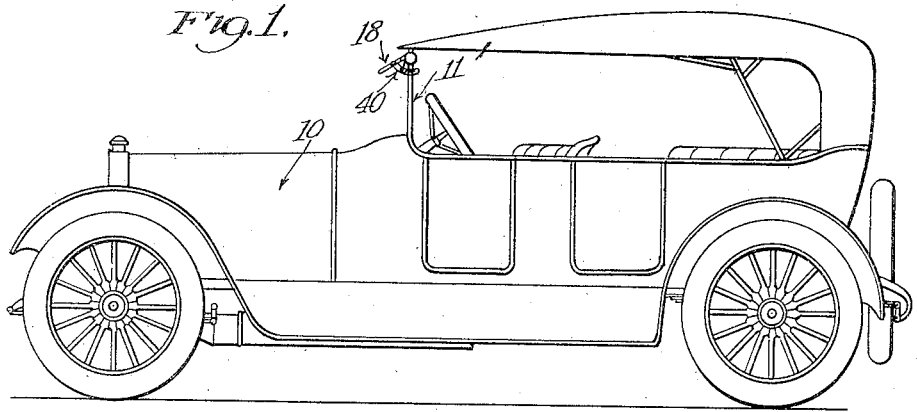
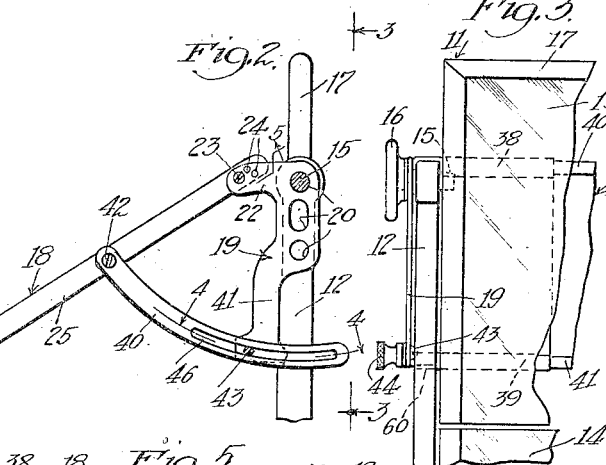
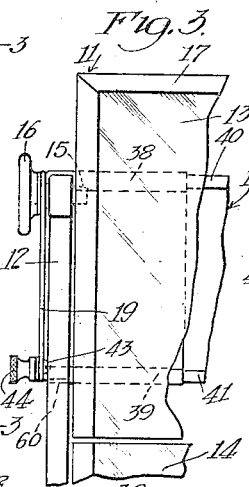
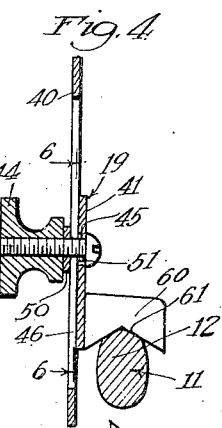
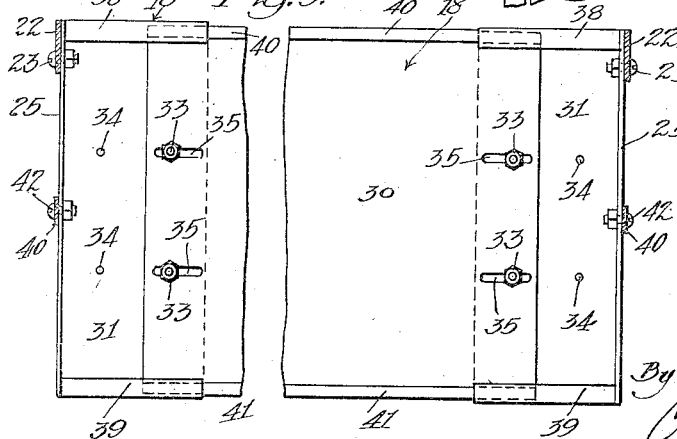
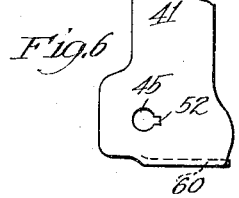
Inventor:
Ernest C. Hillman,
By 
his Attorney

UNITED STATES PATENT OFFICE.

ERNEST C. HILLMAN, OF LOS ANGELES, CALIFORNIA.

RAIN AND SUN SHIELD.

1,374,919.  Specification of Letters Patent.  Patented Apr. 19, 1921.

Application filed June 1, 1920. Serial No. 385,723.

*To all whom it may concern:*

Be it known that I, ERNEST C. HILLMAN, a citizen of the United States, residing at Los Angeles, in the county of Los Angeles, State of California, have invented new and useful Improvement in Rain and Sun Shields, of which the following is a specification.

This invention relates to improvements in rain and sun shields for automobiles and an object of the invention is to provide a device of this character which is applicable to any automobile and which will effectively protect an automobile windshield from both rain and sunlight.

This present invention relates generally to rain and sunshields of the character set forth in my co-pending application entitled, Rain and sun shield, filed January 15, 1920, Serial No. 351,518; and it has to do more specifically with adjustability, construction, etc., of devices of that character.

A particular and noteworthy feature of the invention is the adjustability of the device which makes it applicable to any ordinary, or typical, automobile. This feature is of great importance as it makes the device particularly valuable commercially and permits of standardization of parts and thereby lends to economical manufacture.

Another feature of the invention is the simplicity and the effectiveness of the construction of the device. The simplicity of construction of the device makes it sightly, easily handled, and simple and inexpensive to manufacture, while the effectiveness makes it durable and desirable for use.

There are other objects and features of my invention which will be understood from the following detailed description of a specific preferred form of the invention throughout which reference is had to the accompanying drawings.

Figure 1 is a side elevation of a typical automobile equipped with the device provided by the present invention; Fig. 2 is an enlarged end elevation of the upper portion of the automobile windshield and the device, showing some of the parts in section for sake of clearness; Fig. 3 is a view taken as indicated by line 3—3 on Fig. 2; Fig. 4 is an enlarged sectional view taken as indicated by line 4—4 on Fig. 2; Fig. 5 is a sectional view taken as indicated by line 5—5 on Fig. 2; and Fig. 6 is a detailed sectional view taken as indicated by line 6—6 on Fig. 4.

Throughout the drawings numeral 10 designates a typical automobile having a typical windshield 11. The windshield 11 comprises two vertical standards 12 between which are carried two glass panels 13 and 14. The panel 13, which is the upper panel, is pivotally connected to the standards by pivot pins 15 which extend from its frame through the standards 12 and have clamping nuts 16 screw-threaded on their outer ends. The pivot pins 15 extend from the frame 17, provided on panel 13, and the nuts 16 are provided so that the panel can be clamped or set against movement due to vibration or jarring of the machine etc.

The sun and rain shield 18, provided by the invention, is mounted on the standards 20 by means of brackets 19, so that it extends outwardly and downwardly from the panel 13, as clearly shown in the drawings. The shield 18, the details of which will be hereinafter set forth, is carried between the brackets 19, which are mounted on the standards 12. The brackets 19 are formed with holes or apertures 20 which receive the pivot pins 15 and they are arranged on the pivot pins 15 behind the nuts 16. It will be noted in the drawings that each bracket 19 is formed with a plurality of apertures arranged in a vertical row thereby making it possible to arrange the brackets in various positions, or at several different heights. By being able to mount the brackets 19 in several different positions it is possible to properly install the device on various sized windshields, or to arrange it at any desired height on any one particular windshield, or in other words, the brackets are universally applicable to windshields and are adjustable when considered in connection with any one particular windshield. This is an important feature of the invention as it standardizes the mounting brackets 19, making it necessary to manufacture only one size and type of bracket, and thereby makes it possible to manufacture them economically. This manner of attaching the mounting brackets to the automobile also permits of installation of the device without defacing or injuring any part of the machine, and also allows the device to be installed very easily and quickly as it merely necessitates the removal of nuts 16 in order to arrange the brackets on pins 15.

The shield 18 is pivotally connected to extended portions, or projections, 22, which extend forwardly from the portions of brackets 19 in which the apertures of 20 are formed, by bolts 23. The bolts 23 extend through the apertures 24, in projections 20, and through flanges 25, formed at the end of shield 18. The bolts 23, of course, extend through the flanges 25 at points directly opposite each other. The projection 22 on each bracket 19 is formed with a plurality of apertures 24 thereby making it possible to mount the shield 18 in various positions relative to the bracket 19, and in various positions relative to the windshield panel 13. For instance, the shield can be carried by the brackets 19 so that its rear edge is close to, or is practically at, the panel 13, or it can be carried so that its rear edge is considerably removed, or spaced, from the panel 13. By being able to thus adjust the shield relative to the bracket 19 as well as the brackets relative to the windshield standards, the device is made further universally applicable to any ordinary windshield.

The shield 18 is preferably constructed so that it is longitudinally adjustable, or so that it can be adjusted to fit windshields of various widths. The shield is therefore formed of three members, one central panel 30 and two end panels 31. The end panels 31 are the members which are formed with the flanges 25 and are comparatively short, while the central panel 30 is comparatively long. The panels 31 and the panel 30 overlap where they come together and they are secured together by suitable bolts 33. The bolts 33 extend through holes 34 in the end panels 31 and through longitudinally disposed slots 35 in the central panel 30, which panel is behind the end panels, so that the slots do not appear to a person in front of the automobile. The slots 35 allow for a certain amount of adjustment in the length of the shield 18. To allow for further variation in the length of the shield extra, or additional, holes 34 are provided in the end portion 31 allowing the bolts 33 to be arranged through various parts of the end panels 31. In practice the combined action of the slots 35 and the holes 34 gives the shield a very large range of adjustment. This manner of constructing the shield 18 permits of extremely great variations in length being had by merely employing central panels 30 of various lengths. For instance, if it is desired to provide an extremely wide shield a comparatively large panel 30 can be arranged between the two standard end panels 31, and when an extremely short shield is required a short or small panel 30 can be arranged in connection with the two standard end panels 31. In practice it has been found that by manufacturing only three different sizes of central panels 30 it is possible to provide a shield 18 which will fit any ordinary windshield.

For rigidity and strength, it is preferred that the edges 38 and 39 of the end panels 31, and also that the edges 40 and 41 of the central panel 30, be turned or rolled in the manner shown in the drawings. It will be noted in the drawings, however, that the rolled edges 38 and 39, of the end panel 31, are somewhat larger than the rolled edges 40 and 41, of panel 30, in order that they will receive the rolled edges 40 and 41 of panel 30 when the panels 30 and 31 are arranged so that they overlap, as shown in the drawings. The fitting together of the rolled edges of the panels 30 and 31 greatly strengthens the joint between the panels and also makes the joints between the panels neat and sightly. Further, this construction positively prevents separation, or falling apart, of panels 30 and 31 in the event that the bolts 33 should become displaced or lost as it makes it possible to detach the panels 30 and 31 only by sliding or pulling the panels 31 from the ends of panel 30.

The connection of the shield 18 to the brackets 19, by means of the bolts 23, allows the shield to be swung or adjusted about the bolts 23 and thereby allows it to be set or positioned so that it will most effectively shield the windshield 11. In practice the bolts 23 are not set sufficiently tight to positively hold the shield 18 in any one particular position but are sufficiently loose to allow the shield to be easily moved by hand. To hold the shield 18 in the desired position arms 40 are arranged to extend between the flanges 25, at the ends of the shield 18, and legs 41, which extend downwardly from the portions of brackets 19 in which the apertures 20 are formed. The arms 40 are pivotally secured to the flanges 25 by suitable bolts 42 and are secured to the legs 41 by clamp bolts 43 which carry thumb nuts 44. The bolts 43 extend through suitable bores 45 in the legs 41 and through suitable curved slots 46 in the arms 40. The slots 46 are formed with a curvature practically concentric with the axis of the bolts 23 and are provided so that the shield 18 can be moved or adjusted to various positions, or to various angles, at times when the thumb nuts 44 are loose. At times when it is desired to have the shield 18 firmly set in any one particular position the nuts 44 are tightened on the bolts 43 causing the arms 40 and legs 41 to be clamped between the heads of the bolts 43 and washers 50, which are interposed between the arms 40 and the nuts 44, as clearly shown in Fig. 4 of the drawings. To prevent rotation of the bolts 43 when the nuts 44 are being tightened or loosened suitable feathers or keys 51 are formed on the bolts 43 near their heads to engage suitable notches or seats 52 formed in the bores 45, as clearly shown in Fig. 6. Due to the fact that the axis of pivotal mounting of panel 18, or the location of bolts 23, may be varied or arranging the bolts 23 in different apertures 24, it is desirable that the bolts 42 be left sufficiently loose to allow the arms 40 to swing or move more or less when the shield 18 is being adjusted.

Feet 60 are formed at the lower ends of legs 41 to engage the windshield standards 12 to prevent the weight of the panel 18 from causing movement of brackets 19 about the pivot pins 15. Due to the fact that the weight of the shield 18 is practically the only force tending to move the brackets 19, it is merely necessary to brace the brackets so that their leg portions will not be moved rearwardly. The feet 60 are arranged to engage the forward edges of the standards 12 and thereby prevent rearward movement of the legs 41. In the preferred form of construction the feet 60 are formed with V-shaped sockets or recesses 61 which receive the windshield standards and prevent displacement of the feet from the standards.

From the foregoing description it will be readily understood how all of the various parts of the device may be formed from sheet metal and that no expensive or complicated operations are required for their formation, but it will be understood that the invention is not limited or restricted to the use of sheet metal in the formation of the various parts but that various other forms of metal can be advantageously employed.

Throughout this specification I have described the device, provided by the present invention, in one particular form and in connection with one particular type of automobile windshield. It will be understood that the invention is not limited or restricted to the specific form of construction above set forth and that it is not in any way limited or restricted to application to any one or specific form or construction of windshield. Therefore, I do not wish to limit or restrict myself to the details hereinabove set forth but wish to reserve to myself any changes or variation that may appear to those skilled in the art or that may fall within the scope of the following claims.

Having described a preferred form of my invention, I claim:

1. A rain and sun shield adapted to be secured to the windshield of an automobile comprising a bracket having an opening adapted to receive the windshield pivot pin and having an extended portion, a shield member adjustably mounted upon the bracket, and means for locking and supporting the shield member in its adjusted positions, said means comprising an arm having a slot therein connected to the shield and to the extended portion of the bracket.

2. A rain and sun shield adapted to be secured to the windshield of an automobile comprising brackets each having an opening adapted to receive a windshield pivot pin and having an extended portion, a shield member adjustably mounted upon and between the brackets, and means for locking and supporting the shield member in its adjusted positions, said means comprising an arm having a slot therein connected to the shield and to the extended portion of one of the brackets, a pin on one of said members to which the arm is connected extending through said slot, said pin and said arm being relatively movable upon adjustment of the shield, and means for clamping said arm at any selected positions of said pin within the slot.

3. A rain and sun shield adapted to be secured to the windshield of an automobile comprising a pair of brackets each having an opening adapted to receive a windshield pivot pin and having an extended portion, a shield member adjustably mounted upon and between the brackets, and means for locking and supporting the shield member in its adjusted positions, said means comprising an arm having a slot therein connected to the shield and to the extended portion of one of the brackets, a pin on said bracket extending through the slot, the arm moving relatively to said pin upon movement of the shield member, and a nut on said pin for clamping said arm to the bracket at any selected position of said pin in the slot.

4. A rain and sun shield adapted to be secured upon the windshield of an automobile comprising brackets adapted to be secured to the windshield pivot pins and vertically adjustable relatively to said pins, said brackets having depending portions, a shield member pivotally secured to said brackets, and means for locking and supporting the shield member in its adjusted positions, said means comprising an arm having a curved slot therein connected to the shield and to the depending portion of the bracket below the shield mounting.

5. A rain and sun shield adapted to be secured upon the windshield of an automobile comprising brackets adapted to be secured to the windshield pivot pins and vertically adjustable relatively to said pins, said brackets having depending portions, a shield member pivotally secured to said brackets, and means for locking and supporting the shield member in its adjusted positions, said means comprising an arm having a curved slot therein connected to the shield and to the depending portion of the bracket below the shield mounting, a pin on said bracket extending through the slot, the arm moving relatively to said pin upon movement of the shield member, and means for clamping said arm to the bracket at any selected position of said pin in the slot.

6. In a device of the class described, a bracket for supporting a shield member having a plurality of openings adapted to receive a windshield pivot pin, whereby the bracket may be vertically adjusted upon a windshield, a portion adapted to pivotally support a shield member, and a leg portion having a laterally extending foot to engage a windshield side post and thereby to prevent rocking movement of the bracket about the windshield pivot pin.

7. In a device of the class described, a bracket for supporting a shield member having a plurality of openings adapted to receive a windshield pivot pin, whereby the bracket may be vertically adjusted upon a windshield, a portion adapted to pivotally support a shield member, a leg portion having a laterally extending foot to engage a windshield side post and thereby to prevent rocking movement of the bracket about the windshield pivot pin, and a pin on said depending leg portion adapted to project through a shield member locking and supporting arm.

8. A rain and sun shield, applicable to the ordinary automobile windshield having side posts, comprising a pair of brackets, each bracket having means whereby the bracket is secured to the windshield side post, a shield member adjustably supported upon and extending between said brackets, said shield member comprising a plurality of substantially rigid panel sections, and means for connecting the sections together permitting relative adjustment of the sections to vary the dimension of the member in the direction of its extent between the two brackets.

9. A rain and sun shield applicable to the ordinary automobile windshield, comprising a pair of brackets, said brackets having means whereby they may be secured to the windshield side posts, and a longitudinally adjustable shield member adjustably mounted upon and between said brackets, said shield member comprising a plurality of sections having overturned longitudinal edges, the overturned edges of the adjacent sections telescoping, said sections having slots adjacent their meeting transverse edges, and clamping means passing through said slots whereby the shield member is adjustable and may be held in any adjusted size.

10. A rain and sun shield securable to the windshield of an automobile comprising brackets having means whereby they may be secured to the windshield side posts, and a rigid, lognitudinally adjustable shield member pivotally mounted upon said brackets, said shield member comprising a pair of relatively short end sections having flanges at their outer transverse edges and overturned longitudinal edges, and a relatively long central section extending the major portion of said shield member having an overturned longitudinal edge adapted to be fitted into telescopic relation with the overturned edges of said end section.

11. A rain and sun shield securable to the windshield of an automobile comprising brackets having means whereby they may be secured to the windshield side posts, and a rigid longitudinally adjustable shield member pivotally mounted upon said brackets, said shield member comprising a pair of relatively short end sections having flanges at their outer transverse edges and overturned longitudinal edges, and a relatively long central section extending the major portion of said shield member having an overturned longitudinal edge adapted to be fitted into telescopic relation with the overturned edges of said end section, one of said sections having slots and clamping members passing through the slots and the other section adjacent their transverse edges.

12. A rain and sun shield adapted to be secured to the windshield of an automobile comprising brackets having means whereby they may be secured to the windshield side posts and having downwardly extended portions, a longitudinally adjustable rigid shield member formed of a plurality of relatively movable sections adjustably mounted upon the bracket, and means for locking and supporting the shield member in its adjusted positions, said means comprising an arm having a slot therein connected to the shield and to the extended portion of one of the brackets, a pin on one of said members to which the arm is connected extending through said slot, said pin and said arm being relatively movable upon adjustment of the shield, and means for clamping said arm at any selected positions of said pin within the slot.

13. A rain and sun shield adapted to be secured upon the windshield of an automobile comprising brackets adapted to be secured to the windshield pivot pins and vertically adjustable relatively to said pins, said brackets having depending portions having laterally extending feet to engage the windshield and prevent turning movement of the brackets about the pivot pin, a shield member pivotally secured to said brackets, and means for locking and supporting the shield member in its adjusted positions, said means comprising an arm having a curved slot therein connected to the shield and to the depending portion of the bracket below the shield mounting.

14. A rain and sun shield adapted to be secured to the ordinary automobile windshield, comprising a pair of brackets adapted to be secured to the windshield pivot pins and having a plurality of vertically spaced holes that may be engaged with the pivot pins to adjust the brackets in height, and a shield member adjustably mounted on and supported by and extending between said brackets, said shield member comprising a plurality of sections and means for connecting the sections together permitting relative adjustment of the sections to vary the dimension of the shield member in the direction of its extent between the two brackets.

15. A rain and sun shield applicable to the ordinary automobile windshield, comprising a pair of brackets adapted to be secured to opposite sides of the windshield and each having an opening adapted to receive a windshield pivot pin, and an adjustable shield member adjustably mounted on and extending between said brackets, said shield member comprising a plurality of sections and means for connecting the sections together permitting relative adjustment to vary the dimension of the shield member in the direction of its extent between the brackets.

In witness that I claim the foregoing I have hereunto subscribed my name.

ERNEST C. HILLMAN.